United States Patent
Mayuzumi

(10) Patent No.: US 7,811,009 B2
(45) Date of Patent: Oct. 12, 2010

(54) CAMERA AND CONTROL METHOD THEREFOR, AND CAMERA CRADLE SYSTEM

(75) Inventor: Ichiko Mayuzumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/370,933

(22) Filed: Feb. 13, 2009

(65) Prior Publication Data

US 2009/0153687 A1 Jun. 18, 2009

Related U.S. Application Data

(63) Continuation of application No. 11/531,842, filed on Sep. 14, 2006, now Pat. No. 7,544,000.

(30) Foreign Application Priority Data

Sep. 14, 2005 (JP) ............... 2005-267691

(51) Int. Cl.
G03B 17/56 (2006.01)
G03B 17/48 (2006.01)
H04N 5/232 (2006.01)

(52) U.S. Cl. .................. 396/419; 396/429; 348/207.11; 348/211.99; 348/211.6; 348/211.13

(58) Field of Classification Search ............... None
See application file for complete search history.

(56) References Cited

U.S. PATENT DOCUMENTS

| | | | |
|---|---|---|---|
| 5,666,159 A | 9/1997 | Parulski et al. | |
| 6,445,410 B2 * | 9/2002 | Kawano | 348/211.1 |
| 6,449,438 B1 | 9/2002 | Gennetten | |
| 7,079,177 B2 * | 7/2006 | Okazaki et al. | 348/211.12 |
| 7,119,835 B2 | 10/2006 | Gennetten et al. | |
| 7,210,161 B2 | 4/2007 | Ward et al. | |
| 7,221,386 B2 * | 5/2007 | Thacher et al. | 348/14.02 |
| 7,362,352 B2 * | 4/2008 | Ueyama | 348/207.1 |
| 7,362,462 B2 | 4/2008 | Sadovsky et al. | |
| 7,464,215 B2 * | 12/2008 | Kawai | 710/303 |
| 7,544,000 B2 * | 6/2009 | Mayuzumi | 396/419 |

(Continued)

FOREIGN PATENT DOCUMENTS

JP 2002-199251 A 7/2002

(Continued)

OTHER PUBLICATIONS

English translation of Japanese Laid Open No. 2002-288143, Oct. 4, 2002.

(Continued)

*Primary Examiner*—W. B. Perkey
*Assistant Examiner*—Bret Adams
(74) *Attorney, Agent, or Firm*—Cowan, Liebowitz & Latman, P.C.

(57) ABSTRACT

A camera that has an acquisition unit which acquires an identifier via a cradle apparatus connected to the camera, a comparison unit which compares the identifier acquired by the acquisition unit with an identifier stored in a memory, and a camera controller which controls access of the apparatus connected via the cradle apparatus based on comparison results by the comparison unit.

13 Claims, 14 Drawing Sheets

U.S. PATENT DOCUMENTS

| | | | |
|---|---|---|---|
| 2001/0045983 A1* | 11/2001 | Okazaki et al. | 348/211 |
| 2003/0090572 A1 | 5/2003 | Belz et al. | |
| 2004/0090528 A1 | 5/2004 | Miyamoto | |
| 2004/0201680 A1 | 10/2004 | Gennetten et al. | |
| 2005/0073575 A1* | 4/2005 | Thacher et al. | 348/14.13 |
| 2005/0146612 A1 | 7/2005 | Ward et al. | |
| 2007/0071436 A1* | 3/2007 | Mayuzumi | 396/310 |

FOREIGN PATENT DOCUMENTS

JP  2002-288143 A  10/2002

OTHER PUBLICATIONS

Chinese Office Action dated Dec. 7, 2007 with English translation concerning application No. 2006101275789.

* cited by examiner

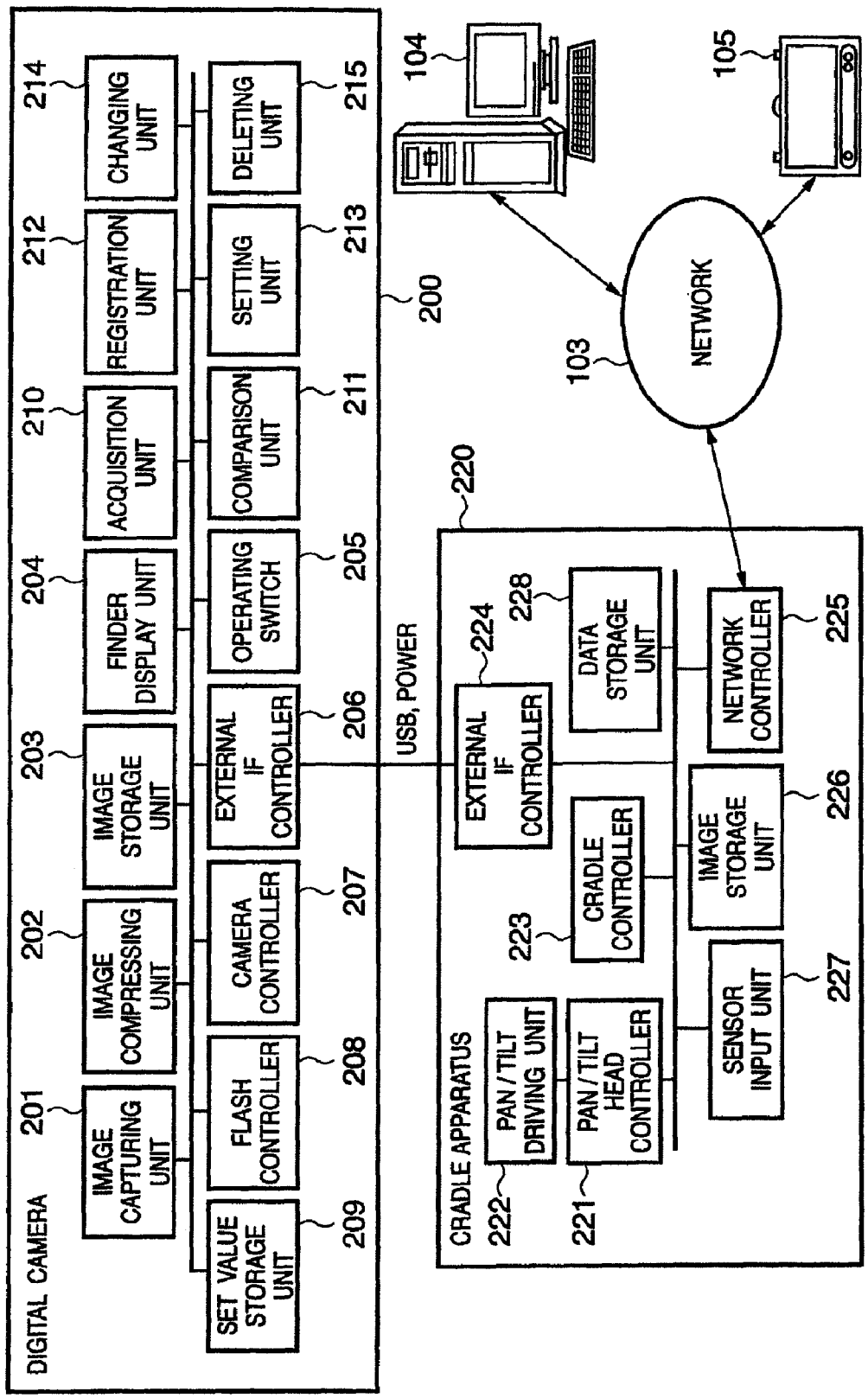

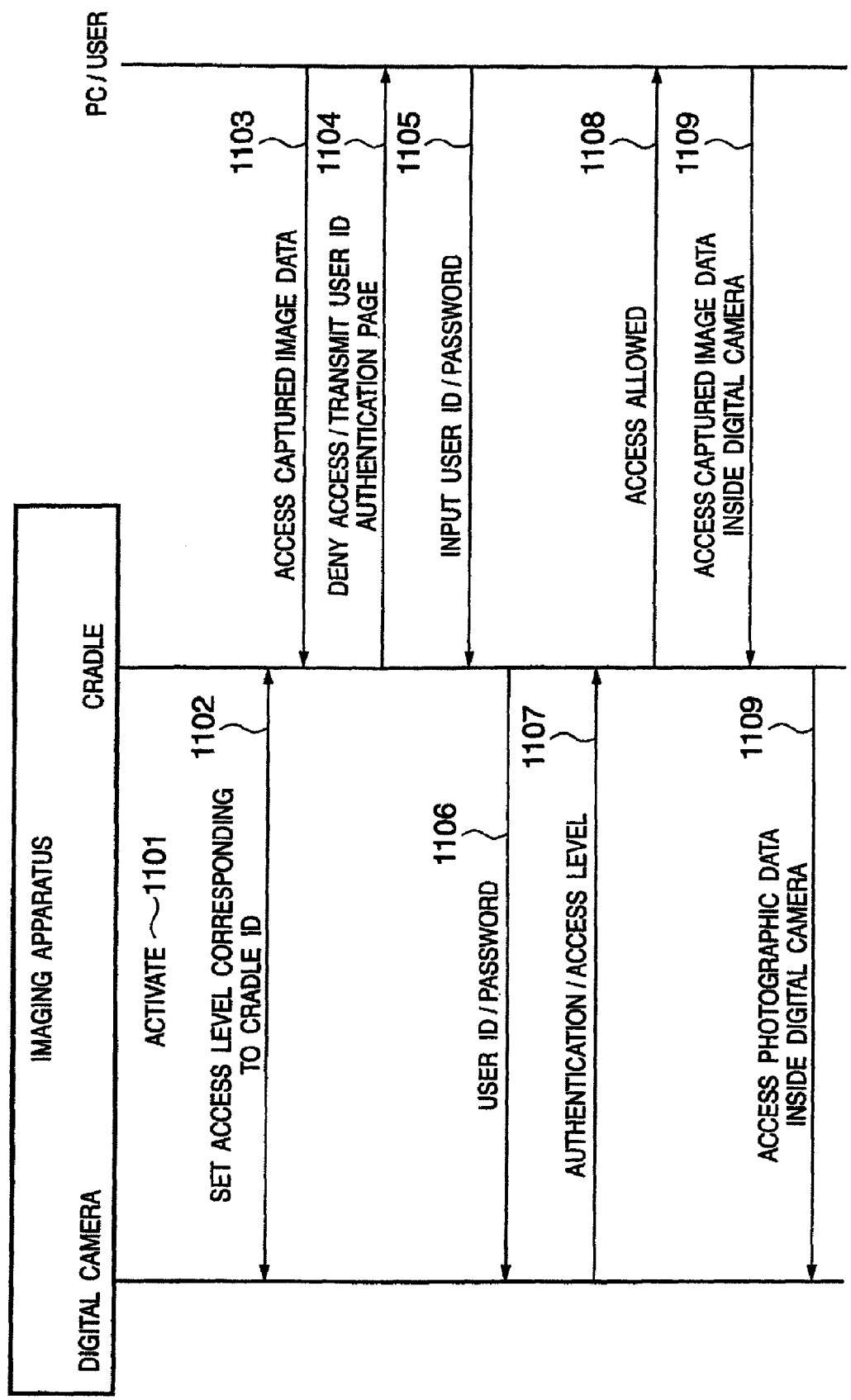

```
ACCESS LEVEL SETTINGS
CRADLE ID : TANAKA RESIDENCE
  ☑ REAL TIME IMAGE
     TRANSMISSION
  ☑ REAL TIME STILL IMAGE
     TRANSMISSION
  ☑ CAMERA OPERATIONS
  ☐ CAPTURED IMAGE DATA
     TRANSMISSION
  ☐ PAN / TILT OPERATIONS
```

```
ACCESS LEVEL SETTINGS
USER ID : KOJIMA
  ☑ REAL TIME IMAGE
     TRANSMISSION
  ☑ REAL TIME STILL IMAGE
     TRANSMISSION
  ☑ CAMERA OPERATIONS
  ☑ CAPTURED IMAGE DATA
     TRANSMISSION
  ☑ PAN / TILT OPERATIONS
```

US 7,811,009 B2

CAMERA AND CONTROL METHOD THEREFOR, AND CAMERA CRADLE SYSTEM

CROSS-REFERENCE TO RELATED APPLICATIONS

The present application is a Continuation of U.S. patent application Ser. No. 11/531,842, filed Sep. 14, 2006, currently pending, to which priority under 35 U.S.C. §120 is claimed. The content of prior application Ser. No. 11/531,842 is hereby incorporated by reference for all purposes as if fully set forth herein. This application also claims foreign priority benefits under 35 U.S.C. §119 to Japanese Patent Application No. 2005-267691, filed in Japan on Sep. 14, 2005, which is hereby incorporated by reference herein.

BACKGROUND OF THE INVENTION

1. Field of the Invention

The present invention relates to a camera and a control method therefor, and a camera cradle system. In particular, the present invention relates to controlling access levels from an apparatus connected to a digital camera.

2. Description of the Related Art

As digital cameras grow in popularity, various unprecedented methods of the use of digital cameras are being studied. For instance, one such method involves providing a pan/tilt function to a pan/tilt head for a digital camera (refer to Japanese Patent Application Laid-Open No. 2002-199251).

As described above, it has become possible to externally transmit or transfer captured image data with greater ease using networking functions, and storing captured image data is now easier and more convenient than ever.

The present inventor has developed a cradle apparatus that is equipped with a data storage function, in addition to a charging function which is a basic function of such an apparatus. In this case, there is a risk of the communication function of the cradle apparatus being used to steal captured image data or to alter the setting of private data to a viewable state. In addition, since restricting access to captured image data requires such restrictions to be respectively configured for individual captured image data in the digital camera, configuration methods may be complicated, and there is a risk that a user may forget to perform configuration.

SUMMARY OF THE INVENTION

The present invention has been made in consideration of the above problems, and an object thereof is to control access levels from an apparatus connected to a camera in an easy manner.

A first aspect of the present invention is related to a camera, and comprises an acquisition unit which acquires an identifier via the cradle apparatus connected to the camera, a comparison unit which compares the identifier acquired by the acquisition unit with an identifier stored in a memory, and a camera controller which controls access of the apparatus connected via the cradle apparatus controller based on comparison results by the comparison unit.

A second aspect of the present invention relates to a camera cradle system, and comprises the above-described camera and a cradle apparatus connected to the camera.

A third aspect of the present invention is related to a camera control method, and comprises a connecting step for connecting a cradle apparatus to a camera, an acquisition step for acquiring an identifier via the connected cradle apparatus, a comparison step for comparing the identifier acquired in the acquisition step with an identifier stored in a memory of the camera, and a control step for controlling access of the apparatus connected via the cradle apparatus based on comparison results obtained in the comparison step.

Further features of the present invention will become apparent from the following description of exemplary embodiments with reference to the attached drawings.

BRIEF DESCRIPTION OF THE DRAWINGS

FIG. 2 is a functional block diagram according to a preferred embodiment of the present invention;

FIG. 13 is a diagram showing a flowchart of imaging apparatus operations using a user ID; and FIGS. 14A and 14B are diagrams showing access levels corresponding to a cradle ID and user ID.

DESCRIPTION OF THE EMBODIMENTS

For a preferred embodiment of the present invention, a detailed description will be provided on an imaging apparatus composed of a digital camera and a cradle apparatus for digital cameras.

Figure 1:
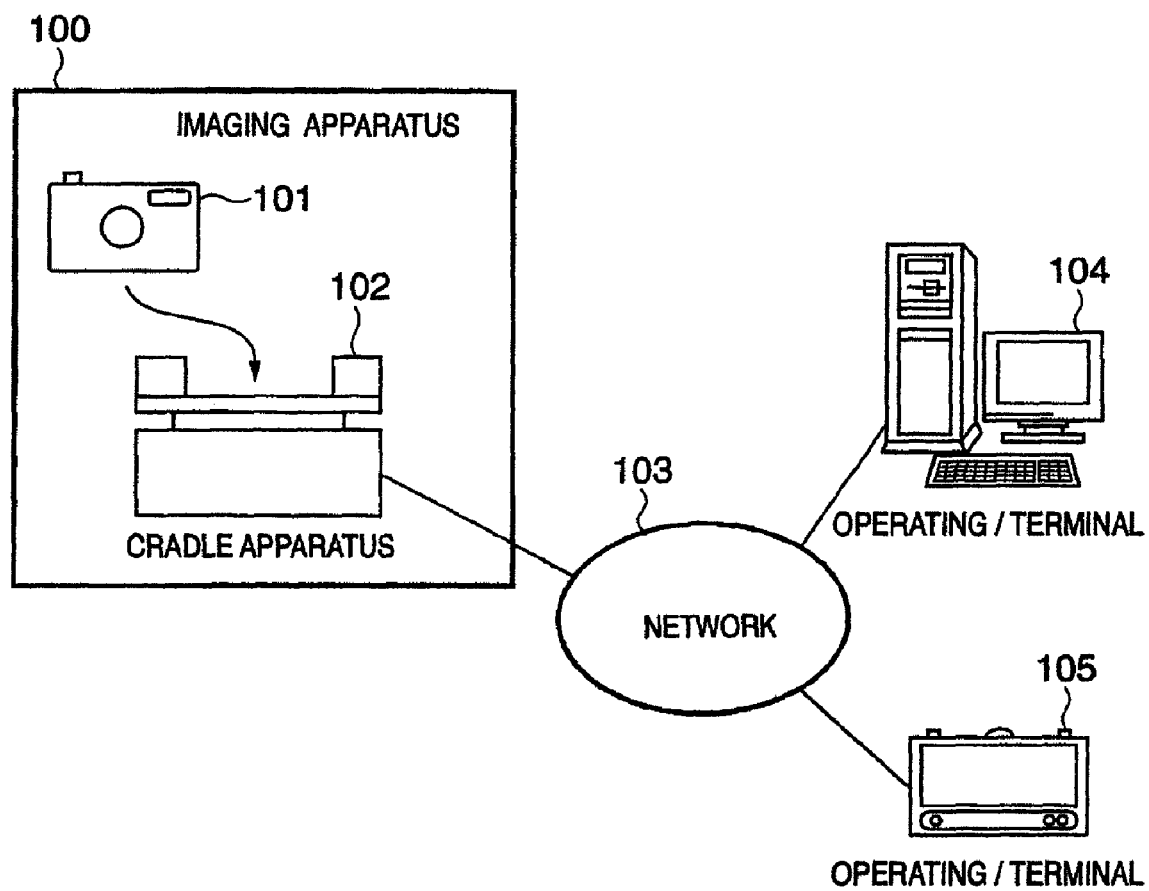
FIG. 1 is a diagram showing a system configuration according to a preferred embodiment of the present invention.

FIG. 1 is a diagram showing a system configuration according to a preferred embodiment of the present invention. Reference numeral 101 denotes a digital camera, while 102 denotes a cradle apparatus. An imaging apparatus 100 is configured by mounting the digital camera 101 onto the cradle apparatus 102. The digital camera 101 is capable of performing its camera control functions such as zooming, focusing and exposure via external control, and is capable of capturing both still images and moving images. The cradle apparatus 102 is structured so that the digital camera 101 may be easily mounted thereon and removed therefrom. In addition, the cradle apparatus 102 is capable of controlling the pan angle and tilt angle of the mounted digital camera 101 through mechanisms such as motors. Furthermore, it is assumed that the digital camera 101, when mounted, is electrically connected to the cradle apparatus 102. In response to operation instructions and the like from a plurality of operating terminals 104 and 105, the cradle apparatus 102 enables viewing of finder images of the digital camera 101 and control of the digital camera 101 or the pan/tilt head through a network 103 such as a LAN or the Internet. The cradle apparatus 102 also has a storage unit with a relatively large capacity which is capable of accumulating images of the digital camera 101. Furthermore, the cradle apparatus 102 is capable of controlling the power source or the like of the digital camera 101 via external sensors such as a motion sensor.

FIG. 2 is a functional block diagram according to a preferred embodiment of the present invention. Reference numeral 200 denotes a digital camera, while 220 denotes a cradle apparatus. Reference numerals 101 and 102 of FIG. 1 respectively correspond to reference numerals 200 and 220 of FIG. 2. The digital camera 200 comprises an image capturing unit 201, an image compressing unit 202, an image storage unit 203, a finder display unit 204, an operating switch 205, an external interface controller (external IF controller) 206, a camera controller 207, and a flash controller 208. The digital camera 200 further comprises an acquisition unit 210, a comparison unit 211, a registration unit 212, a setting unit 213, a changing unit 214 and a deleting unit 215. The digital camera 200 has basic functions of a digital camera. The image capturing unit 201 includes a lens, an image capturing device, an image signal processing circuit and the like. The image compressing unit 202 compresses digital image data obtained from the image capturing unit 201 using JPEG and the like, in the case of still images, and using Motion JPEG or MPEG4 and the like in the case of moving images. Compressed image data is recorded in the image storage unit 203 as files. The finder display unit 204 is capable of displaying images currently being captured, images previously captured or other operation GUIs, and changing settings such as release or image quality using the operating switch 205. In addition, the angle of view is arranged to be configurable while viewing images instead of viewing an optical finder. The external interface controller 206 is a unit responsible for exchanging control signals or power between the digital camera 200 and the outside, and includes a USB (Universal Serial Bus) interface as well as a power interface for driving and charging the camera. The external interface controller 206 receives control commands from the cradle apparatus 220, and transmits images to the cradle apparatus 220. The camera controller 207 controls each component within the digital camera 200. A set value storage unit 209 stores set values set according to commands from either the operating switch 205 or the cradle apparatus 220. In addition, the set value storage unit 209 stores an identifier included in the cradle apparatus 220, to be described later, which is used to identify the cradle apparatus 220, and an access level associated with the identifier. The acquisition unit 210 acquires the identifier of the cradle apparatus 220 via the cradle apparatus 220 connected to the external interface controller 206. In addition, the acquisition unit 210 may also acquire an identifier (user name or the like) inputted from an external apparatus connected via the cradle apparatus 220 connected to the external interface controller 206. The comparison unit 211 compares the identifier acquired by the acquisition unit 210 with an identifier stored in the set value storage unit 209 or a memory such as a removable memory or the like attached to the digital camera 200. The registration unit 212 registers the identifier of the cradle apparatus 220 in the above-mentioned memory. The setting unit 213 sets an access level corresponding to the identifier registered in the above-mentioned memory. The changing unit 214 changes the access level set by the setting unit 213. The deleting unit 215 deletes the identifier registered in the above-mentioned memory as well as the access level corresponding to the identifier.

The cradle apparatus 220 comprises a pan/tilt driving unit 222, a pan/tilt head controller 221, a cradle controller 223, an external interface controller 224, a network controller 225, an image storage unit 226, a sensor input unit 227, and a data storage unit 228. The pan/tilt driving unit 222 performs pan/tilt driving of the digital camera 200. The pan/tilt head controller 221 controls the pan/tilt driving unit 222. The cradle controller 223 controls the entire cradle apparatus 220. The external interface controller (external IF controller) 224 is an interface controller for providing power to the digital camera 200 and for controlling the digital camera 200 via USB. The external interface controller 224 transmits control commands to the digital camera 200, and externally retrieves responses such as image data from the digital camera 200. The pan/tilt head of the cradle apparatus 220 has a connecting mechanism which enables the external interface controller 206 of the digital camera 200 and the external interface controller 224 of the cradle apparatus 220 to be electrically connected when the digital camera 200 is mounted onto the cradle apparatus 220. It is assumed that whether the digital camera 200 is mounted onto the cradle apparatus 220 may be determined by the electrical characteristics of the power source or the USB at the external interface controller 224. Methods of exchanging control signals with the outside should not be limited to USB, and IEEE 1394 or the like may be used instead. In addition, the USB should not be limited to wired connection, and a form of wireless connection such as wireless USB may be adopted. In a wireless connection form, the digital camera 200 and the cradle apparatus 220 should not be physically connected. Instead, bringing the digital camera 200 and the cradle apparatus 220 close to each other to establish connection according to a protocol such as USB would suffice. The network controller 225 is a network interface which exchanges control commands or the like through connection with the operating terminals 104 and 105. The network controller 225 interprets control commands from the operating terminals 104 and 105 via the network 103 to control the digital camera 200 and the pan/tilt head. The network controller 225 also sends captured images to the operating terminals 104 and 105 via the network 103. The image storage unit 226 is a large-capacity storage unit such as a hard disk with sufficient capacity to store images captured by the digital camera 200. The sensor input unit 227 is a unit which retrieves signals from the motion sensor as triggers. The image storage unit 226 temporarily stores data and the like with which the digital camera 200 is to be set. In addition, the image storage unit 226 stores an identifier for individual recognition of the cradle apparatus 220. A method in which the serial number of the cradle apparatus 220 is used as an identifier will now be described as an example for individual recognition.

The respective numbers of the cradle apparatus 220 and the operating terminals 104 and 105 to be connected to the network 103 are not restricted to the numbers described in the preferred embodiment of the present invention. Instead, a large number of such apparatuses and terminals may exist, as long as they are identifiable through addresses or the like. In addition, as for the network 103, a digital network such as the Internet or an intranet with a band sufficient for transferring camera control signals and compressed image signals would suffice. Furthermore, as for the operating terminals 104 and 105, terminals such as PCs, mobile phones, PDAs or network TVs are preferred. Therefore, while modes of physical connection to the network 103 may include wireless connections in addition to wired connections, such connections are not limited to any particular physical mode as long as the connections are made according to protocols.

The access levels of the imaging apparatus 100 will now be described. Items which determine access levels include: 1. real time image transmission; 2. real time still image transmission; 3. camera operations; 4. captured image data transmission; 5. pan/tilt operations and the like. The access level of the imaging apparatus 100 is determined by setting each item to either permit or deny access.

1. Real Time Image Transmission

The imaging apparatus 100 is capable of transmitting real time images of the digital cameras 101 and 200 to the operating terminals 104 and 105 via the network 103. For instance, the operating terminal 105 may perform simplified monitoring by receiving real time images from the imaging apparatus 100. This item determines whether transmission of real time images by the imaging apparatus 100 to the network 103 will be permitted.

2. Real Time Still Image Transmission

The imaging apparatus 100 is capable of transmitting high-definition still images captured by the digital camera 101 to the operating terminals 104 and 105 via the network 103. Similar to the item of real time image transmission, when using the imaging apparatus 100 as a monitoring camera, still images may be acquired along with real time images. This item determines whether transmission of real time still images by the imaging apparatus 100 to the network 103 will be permitted.

3. Camera Operations

Zoom and brightness of the digital camera 101 of the imaging apparatus 100 may be controlled from the operating terminals 104 and 105 via the network 103. When using the imaging apparatus 100 as a monitoring camera, target images may be acquired at a higher definition by operating the digital camera 101. This item determines whether the imaging apparatus 100 will allow remote camera operations.

4. Captured Image Data Transmission

Captured image data which has already been captured is stored in the digital camera 101 of the imaging apparatus 100 in the image storage unit 203. The operating terminals 104 and 105 enable easy viewing of images captured by the digital camera 101 by acquiring captured image data from the imaging apparatus 100 and displaying such data on a television monitor or the like. In addition, organizing data is made easier by storing captured image data in a PC and deleting captured image data existing in the digital camera 101. However, on the other hand, since captured image data is private in nature, the user may desire to deny access from the network 103. This item determines whether the imaging apparatus 100 will permit access to captured image data stored in the digital camera 101.

5. Pan/Tilt Operations

The cradle apparatuses 102 and 220 of the imaging apparatus 100 include the pan/tilt driving unit 222 and the pan/tilt head controller 221. When using the imaging apparatus 100 as a monitoring camera, target images may be acquired from a wider range by controlling pan/tilt operations through the operating terminals 104 and 105. The imaging apparatus 100 is configured by the digital camera 101 and the cradle apparatus 102. When the cradle apparatus 102 is combined with a digital camera 101 which is larger than the cradle apparatus 102, thereby making it inappropriate to stably perform pan/tilt operations, remote pan/tilt operations may be arranged to be prohibited. This item determines whether the imaging apparatus 100 will allow remote pan/tilt operations.

The items which determine access levels are as described above. Since the imaging apparatus 100 is composed of the digital camera 101 and the cradle apparatus 102, it is desirable that access levels be set using combinations thereof. For a preferred embodiment of the present invention, access levels are set by the combination of the digital camera 101 and the cradle apparatus 102. Therefore, the cradle apparatus 102 is provided with a serial number and the like which enables individual recognition, and an access level corresponding to the serial number of the cradle apparatus 102 is set and stored at the digital camera 101 side. Access levels of the imaging apparatus 100 are retained in this manner. The serial number of the cradle apparatus 102 is stored in the data storage unit 228 shown in FIG. 2. The digital camera 101 internally stores the serial number of the cradle apparatus 102 (hereinafter referred to as cradle ID) and the access level in the set value storage unit 209 shown in FIG. 2.

TABLE 1

| CRADLE ID | ACCESS LEVEL |
| --- | --- |
| HOME CRADLE | REAL TIME IMAGE TRANSMISSION: ALLOWED<br>REAL TIME STILL IMAGE TRANSMISSION: ALLOWED<br>CAMERA OPERATIONS: ALLOWED<br>CAPTURED IMAGE DATA TRANSMISSION: ALLOWED<br>PAN/TILT OPERATIONS: ALLOWED |
| OFFICE CRADLE | REAL TIME IMAGE TRANSMISSION: ALLOWED<br>REAL TIME STILL IMAGE TRANSMISSION: ALLOWED<br>CAMERA OPERATIONS: ALLOWED<br>CAPTURED IMAGE DATA TRANSMISSION: DENIED<br>PAN/TILT OPERATIONS: ALLOWED |
| TANAKA RESIDENCE | REAL TIME IMAGE TRANSMISSION: ALLOWED<br>REAL TIME STILL IMAGE TRANSMISSION: ALLOWED<br>CAMERA OPERATIONS: ALLOWED<br>CAPTURED IMAGE DATA TRANSMISSION: DENIED<br>PAN/TILT OPERATIONS: DENIED |
| C54Y293WZ24 | REAL TIME IMAGE TRANSMISSION: ALLOWED<br>REAL TIME STILL IMAGE TRANSMISSION: ALLOWED<br>CAMERA OPERATIONS: DENIED<br>CAPTURED IMAGE DATA TRANSMISSION: DENIED<br>PAN/TILT OPERATIONS: DENIED |
| OTHER CRADLES | REAL TIME IMAGE TRANSMISSION: ALLOWED<br>REAL TIME STILL IMAGE TRANSMISSION: ALLOWED<br>CAMERA OPERATIONS: DENIED<br>CAPTURED IMAGE DATA TRANSMISSION: DENIED<br>PAN/TILT OPERATIONS: DENIED |

Table 1 shows correlations of cradle IDs and access levels, which are both stored in the digital camera 101. Cradle IDs are labeled for better clarity for the user, and in the case of Table 1, cradle IDs include a home cradle, an office cradle, Tanaka residence and the like. With access levels, information regarding allowing or denying of the access items described earlier is stored in correspondence to the cradle apparatus 102.

By storing cradle IDs and access levels to correlate with each other in digital camera 101, the following settings will be enabled. More specifically, when the cradle apparatus 102 is at home, the access level may be set so that captured image data may be accessed. When the cradle apparatus 102 is at a location other than the home, the access level may be set so that access to captured image data is denied. This eliminates the risk of having captured image data stored in the digital camera 101 accessed via the network 103 even if the cradle apparatus 102 has communication capabilities. Therefore, it is possible to charge the digital camera 101 at the Tanaka residence, or use the digital camera 101 of the imaging apparatus 100 at the office as a monitoring camera.

Next, a method of registering cradle IDs and access levels with the digital camera 101, as well as methods of editing and deleting IDs will be described.

First, a method of registering cradle IDs (serial numbers of cradle apparatuses) with the digital camera 101 and setting access levels will be described with reference to FIGS. 3A, 3B, 4A to 4E and 5.

Figure 3A:
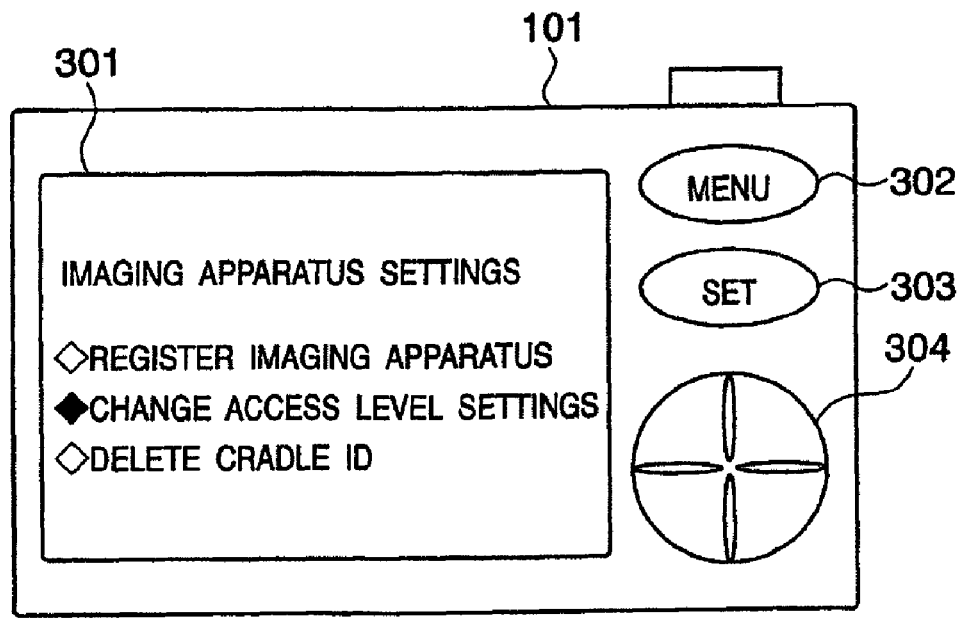
FIG. 3A is a diagram showing an operating panel face of a digital camera.

FIG. 3A is a diagram showing the back side of the digital camera 101, which is the face that is opposite to the lens face, which has a camera operating panel. Reference numeral 301 denotes a display panel as a display unit, which is composed of a LCD and the like. Reference numerals 302, 303 and 304 denote operating switches. Labels are attached to the switches, such as MENU to 302 and SET to 303, while reference numeral 304 denotes a direction key which includes the directions of up and down, and left and right. Each switch is assigned a function corresponding to the operation status. Using the display panel and the switches, registration of a cradle apparatus, or configuration of an operation GUI which enables setting of access levels, may be performed in addition to normal camera setting operations. FIG. 3A shows one such example. When the user presses the MENU button 302 when the digital camera 101 has been turned on, menu items corresponding to the state of the digital camera 101 are displayed (not shown). An example of a menu hierarchy to be displayed is shown as reference numeral 310 in FIG. 3B. In the menu hierarchy, settings of image quality or compression parameters, as well as a basic setting menu, are arranged at the top menu. The basic settings menu includes an item for imaging apparatus settings menu, which in turn includes menus for registering cradle IDs, setting/changing access levels and deleting cradle IDs. Examples of display screens corresponding to each menu are shown as reference numeral 320 in FIG. 4A, 330 in FIG. 4B, 340 in FIG. 4C, 350 in FIG. 4D and 360 in FIG. 4E.

Figure 5:
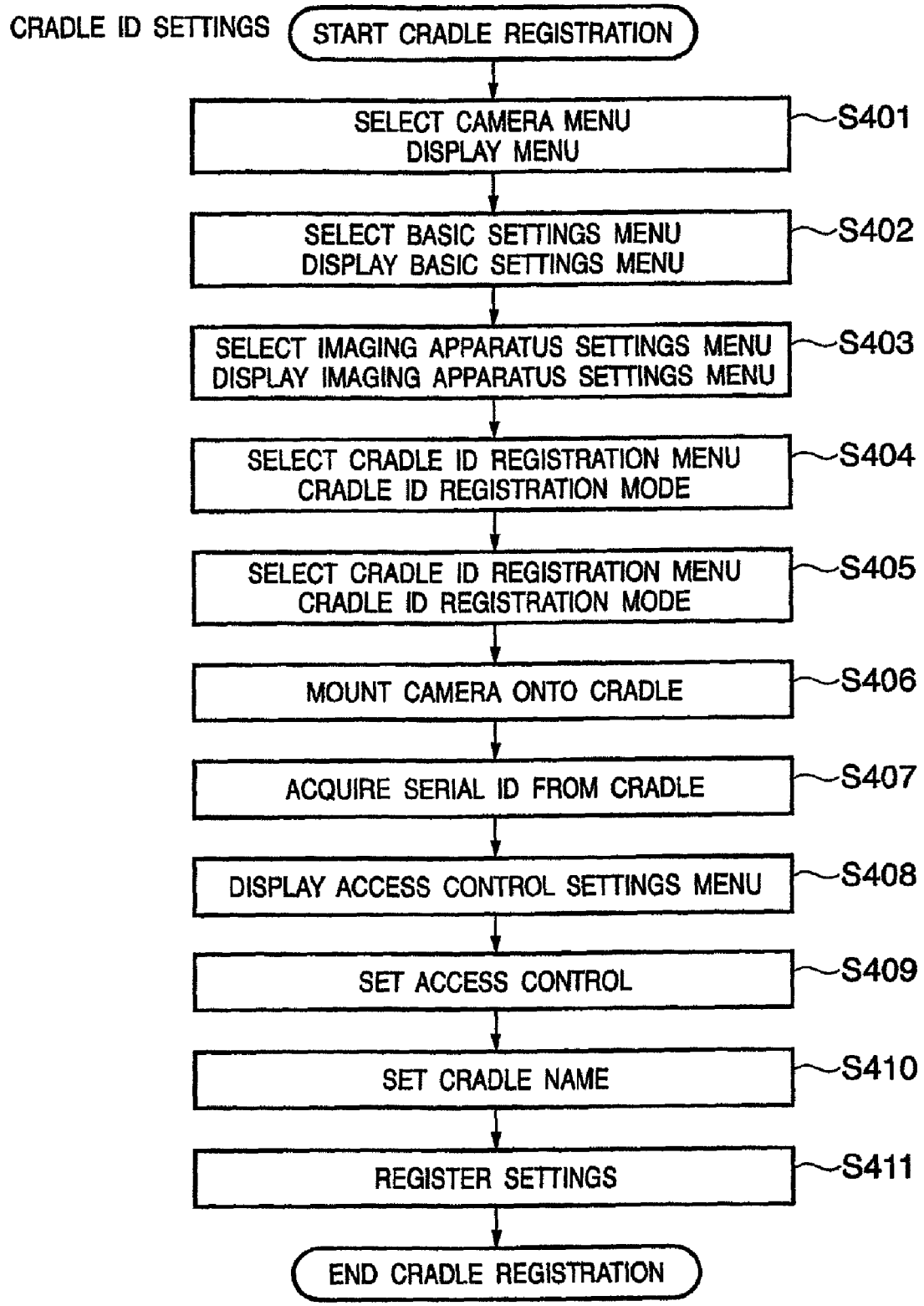
FIG. 5 is a diagram showing a flowchart of setting a cradle ID.

FIG. 5 is a diagram showing a flowchart of registering a cradle ID with the digital camera 101.

In step S401, when the user presses the MENU button 302 of the digital camera 101, the camera controller 207 causes a camera menu (menu hierarchy 310) to be displayed on the display unit 301 of the digital camera 101.

In step S402, the user uses the direction key 304 to select "basic settings menu" from the displayed menu items, and presses the SET button 303. This causes the camera controller 207 to advance its menu hierarchy until the items in "basic settings menu" are displayed on the display unit 301.

In step S403, the user uses the direction key 304 and the SET button 303 in the same manner to select "imaging apparatus settings menu" from the basic settings menu. This causes the camera controller 207 to display the items in the imaging apparatus settings menu 320, shown in FIG. 4A, on the display unit 301.

Figure 4A:
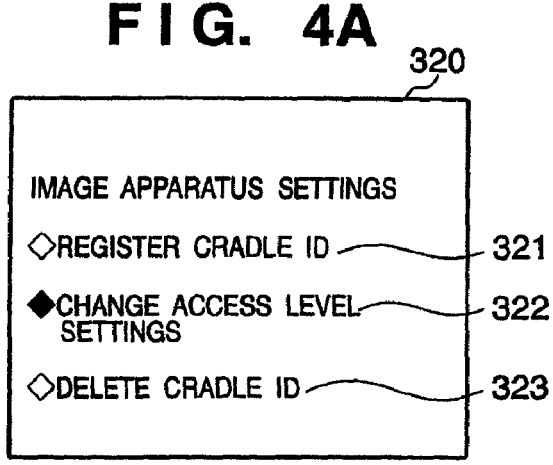
FIGS. 4A to 4E are diagrams showing examples of display screens corresponding to menus of the digital camera.

In step S404, the user selects "register cradle ID" 321 in the imaging apparatus settings menu 320 shown in FIG. 4A in order to register the cradle ID with the digital camera 101.

Figure 4B:
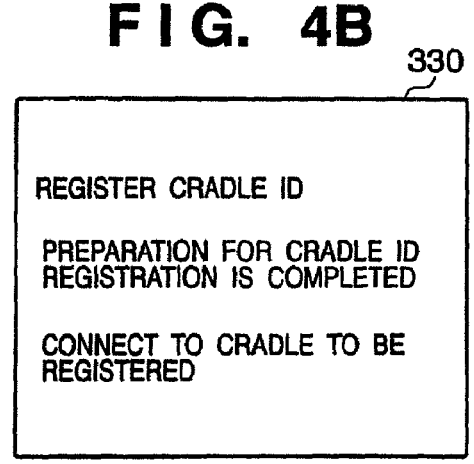

In step S405, when cradle ID registration is selected, the digital camera 101 enters cradle ID registration mode. The camera controller 207 causes a message notifying the user that preparations for cradle ID registration has been completed to be displayed on the display unit 301, as depicted in FIG. 4B as reference numeral 330.

In step S406, the user mounts the digital camera 101 onto the cradle apparatus 102 which the user wishes to register.

In step S407, when the digital camera 101 and the cradle apparatus 102 are connected, communication set up is automatically performed, and a mutually communicable state is achieved. After entering the mutually communicable state, the acquisition unit 210 acquires a serial number for individually identifying the cradle apparatus 102 from the same.

Figure 4C:
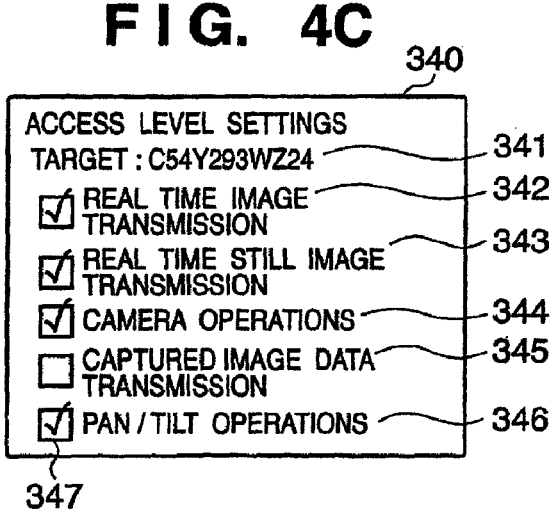
Figure 4D:
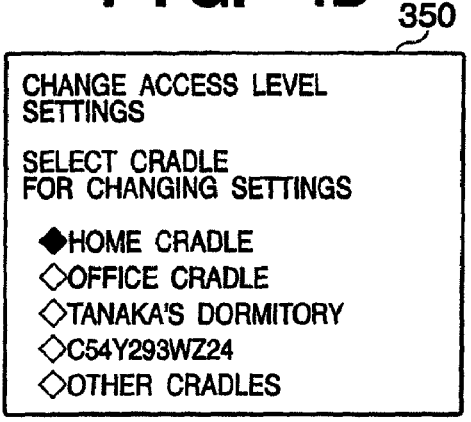
Figure 4E:
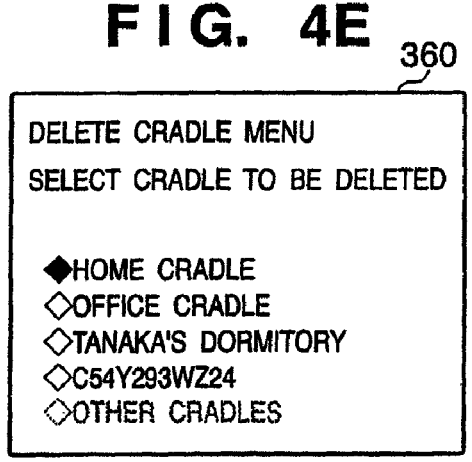

In step S408, the camera controller 207 causes a menu for setting access controls corresponding to the acquired serial number, or, in other words, cradle ID, to be displayed on the display unit 301. Reference numeral 340 in FIG. 4C is a menu for setting access controls. The cradle ID acquired earlier is displayed as reference numeral 341. As menus for setting access levels, the access level items of real time image transmission 342, real time still image transmission 343, camera operations 344, captured image data transmission 345 and pan/tilt operations 346, described earlier, are displayed. Each of these items has a check box 347, and access to the corresponding item is permitted by checking the check box.

In step S409, based on operations of the direction key 304 and the SET button 303 by the user, the setting unit 213 sets an access level of the cradle apparatus 102 to be registered.

In step S410, after the access level has been set, the registration unit 212 registers an identifier (name or the like) corresponding to the cradle ID. The value of the cradle ID acquired earlier may be used as-is for name registration.

In step S411, after all processes up to and including name registration have been concluded, the registration unit 212 confirms the access level, and registers settings. Through the above operations, as well as operations by the imaging apparatus 100, a cradle ID is registered with the digital camera 101.

Next, a method of changing an access level registered with the digital camera 101 will be described with reference to FIGS. 3A, 3B, 4A to 4E and 6.

Figure 6:
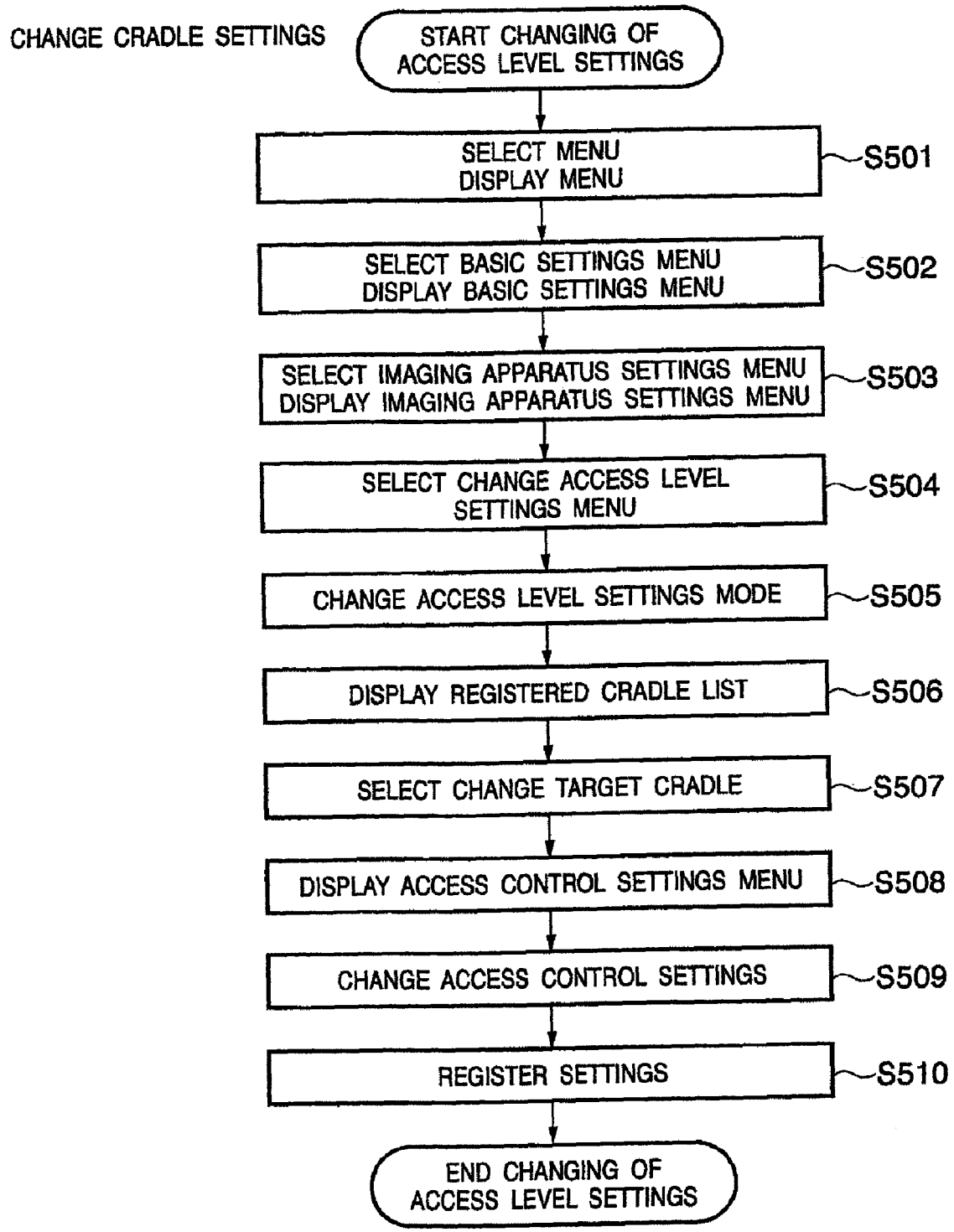
FIG. 6 is a diagram showing a flowchart of changing access level settings.

For the operations at the digital camera 101 described below, the digital camera 101 may or may not be mounted onto the cradle apparatus 102. FIG. 6 is a diagram showing a flowchart for changing access levels.

In step S501, when the user presses the MENU button 302 of the digital camera 101, the camera controller 207 causes a camera menu (menu hierarchy 310) to be displayed on the display unit 301 of the digital camera 101.

In step S502, the user uses the direction key 304 to select "basic settings menu" from the displayed menu items, and presses the SET button 303. This causes the camera controller 207 to advance its menu hierarchy until the items in "basic settings menu" are displayed on the display unit 301.

In step S503, the user uses the direction key 304 and the SET button 303 in the same manner to select "imaging apparatus settings menu" from the basic settings menu. This causes the camera controller 207 to display the items in the imaging apparatus settings menu 320, shown in FIG. 4A, on the display unit 301.

In step S504, the user selects "change access level settings" 322 in the imaging apparatus settings menu 320 shown in FIG. 4A in order to change an access level that has already been registered.

In step S505, when changing access level settings is selected, the digital camera 101 enters a change access level settings mode. The camera controller 207 causes the change access level settings menu 350, shown in FIG. 4D, to be displayed on the display unit 301 of the digital camera 101. The displayed menu includes an item named "other cradles," in addition to a list of cradle apparatuses 102 that have already been registered. "Other cradles" is an item for setting an access level of the imaging apparatus 100 involving a combination with a cradle apparatus other than the registered cradle apparatuses 102.

In step S507, the user uses the direction key 304 to select a cradle apparatus corresponding to the access level which the user wishes to change from the displayed list.

In step S508, after a cradle apparatus has been selected, the camera controller 207 causes the access level settings menu 340 of FIG. 4C to be displayed on the display unit 301. The access level settings menu 340 is similar to the menu used for setting access levels during cradle ID registration described earlier.

In step S509, in the same manner as with the case of cradle ID registration, the user uses the direction key 304 to check/uncheck the items to be permitted access to change settings to a desired access level.

In step S510, after completing settings, the changing unit 214 registers the edited settings to conclude changing of access level settings.

Next, a method of deleting a cradle ID registered with the digital camera 101 will be described with reference to FIGS. 3A, 3B, 4A to 4E and 7.

Figure 7:
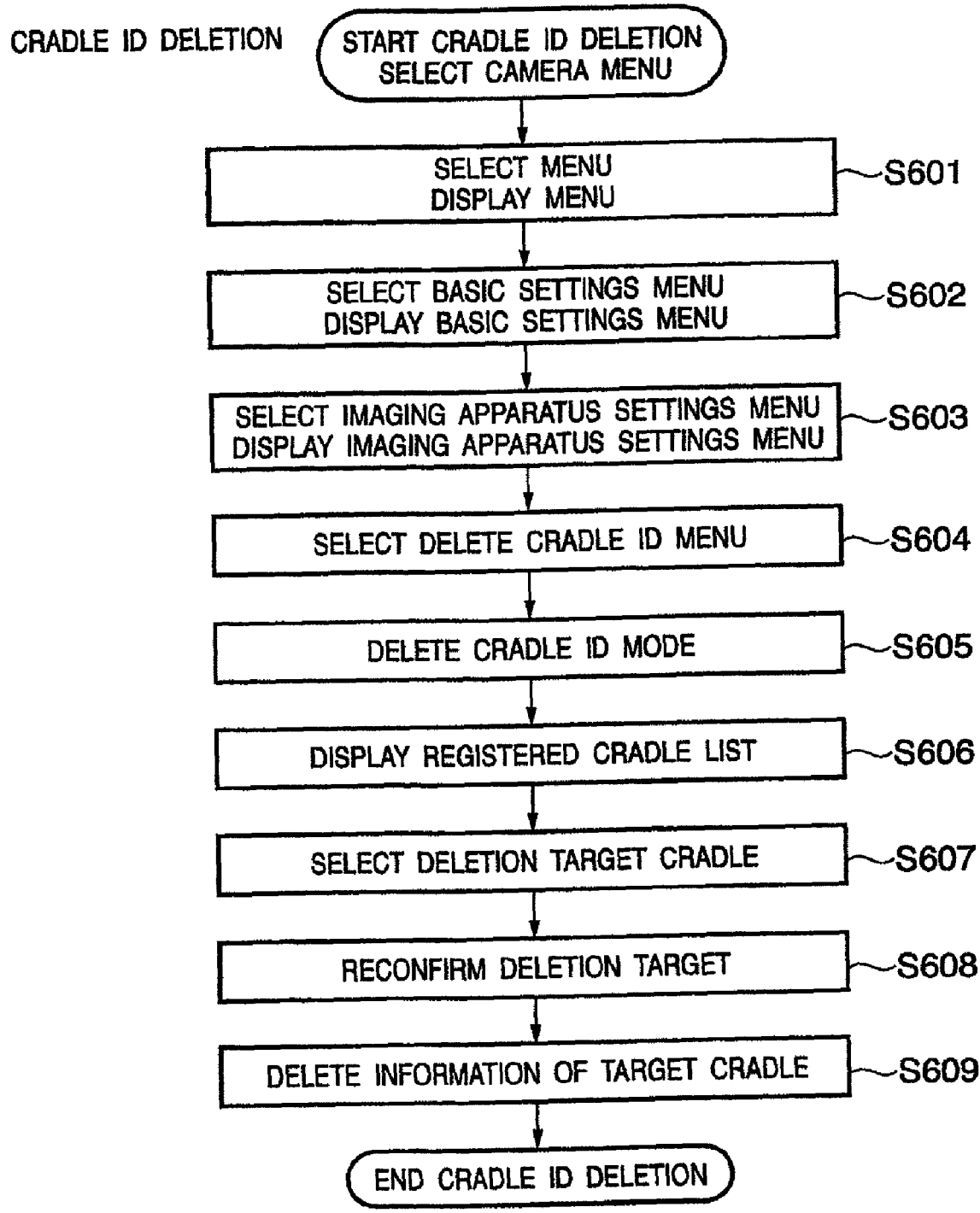
FIG. 7 is a diagram showing a flowchart of deleting a cradle ID.

In the operations at the digital camera 101 described below, the digital camera 101 may or may not be mounted onto the cradle apparatus 102. FIG. 7 is a diagram showing a flowchart of deleting a cradle ID registered with the digital camera 101.

In step S601, when the user presses the MENU button 302 of the digital camera 101, the camera controller 207 causes a camera menu (menu hierarchy 310) to be displayed on the display unit 301 of the digital camera 101.

Figure 3B:
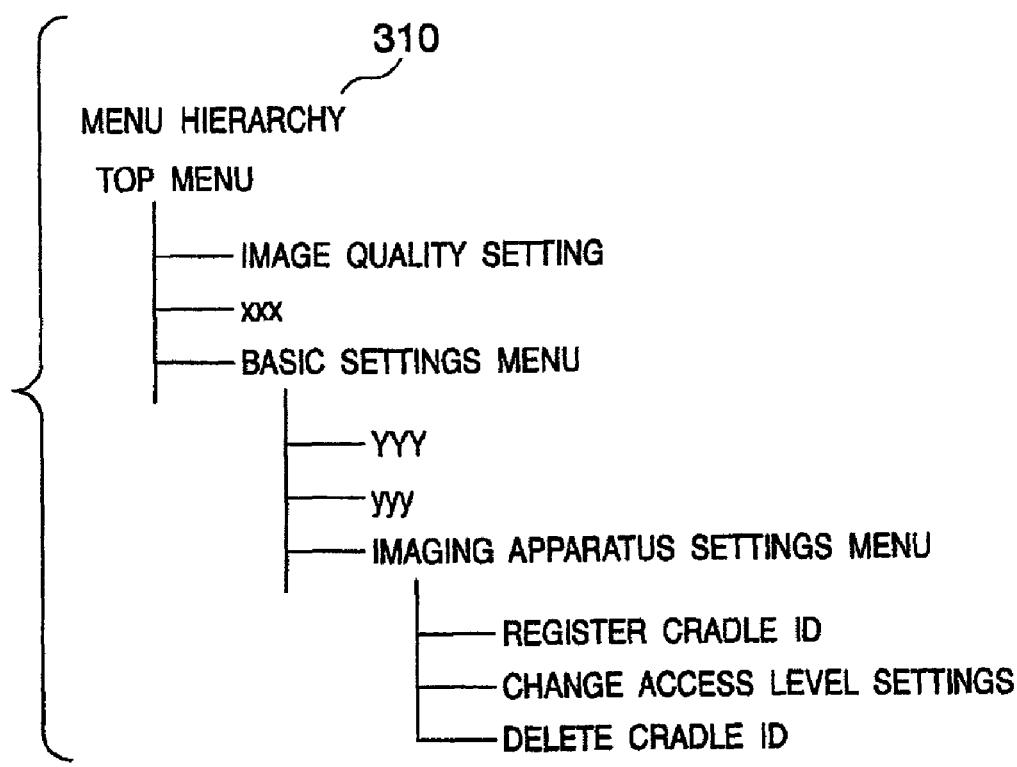
FIG. 3B is a diagram showing a menu of the digital camera.

In step S602, the user uses the direction key 304 to select "basic settings menu" from the displayed menu items, and presses the SET button 303. This causes the camera controller 207 to advance its menu hierarchy until the items in "basic settings menu" shown in FIG. 3B are displayed on the display unit 301.

In step S603, the user uses the direction key 304 and the SET button 303 in the same manner to select "imaging apparatus settings menu" from the basic settings menu. This causes the camera controller 207 to display the items in the imaging apparatus settings menu 320, shown in FIG. 4A, on the display unit 301.

In step S604, the user selects "delete cradle ID" 323 in the imaging apparatus settings menu 320 shown in FIG. 4A in order to delete the registered cradle ID.

In step S605, when cradle ID deletion is selected, the digital camera 101 enters cradle ID deletion mode. The camera controller 207 causes the cradle ID deletion menu 360, shown in FIG. 4E, to be displayed on the display unit 301 of the digital camera 101.

In step S606, the camera controller 207 causes a list of already registered cradle apparatuses to be displayed in the menu displayed on the display unit 301.

In step S607, the user uses the direction key 304 to select a cradle ID to be deleted from the displayed list.

In step S608, once a cradle ID is selected, the camera controller 207 prompts the user to verify the cradle ID to be deleted for reconfirmation.

In step S609, after the user reconfirms the deletion target using the SET button 303, the deleting unit 215 deletes information regarding the target cradle apparatus. Through the above operations, a cradle ID registered with the digital camera 101 is deleted.

Figure 8:
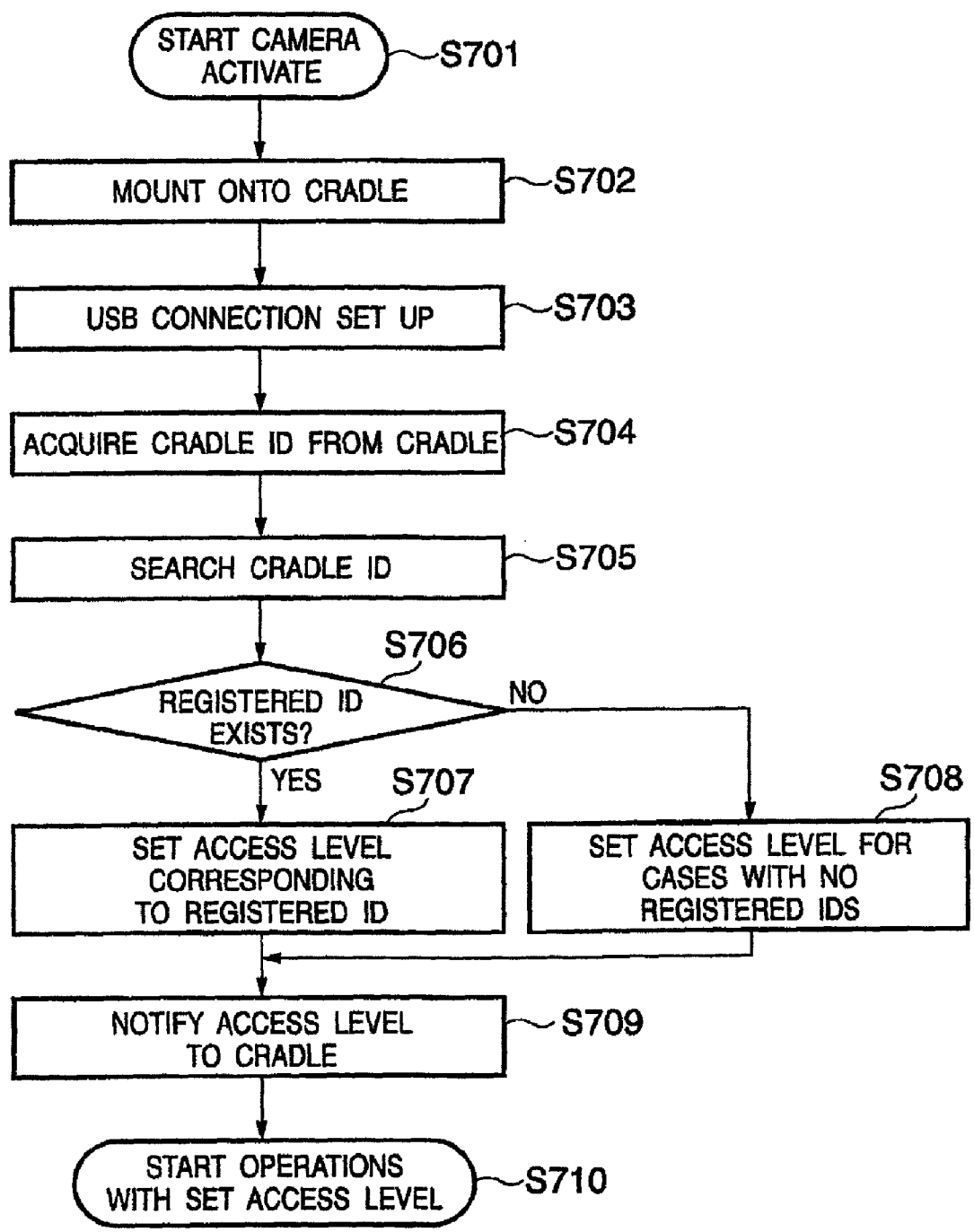
FIG. 8 is a diagram showing a flowchart of the digital camera for setting access levels.
Figure 9:
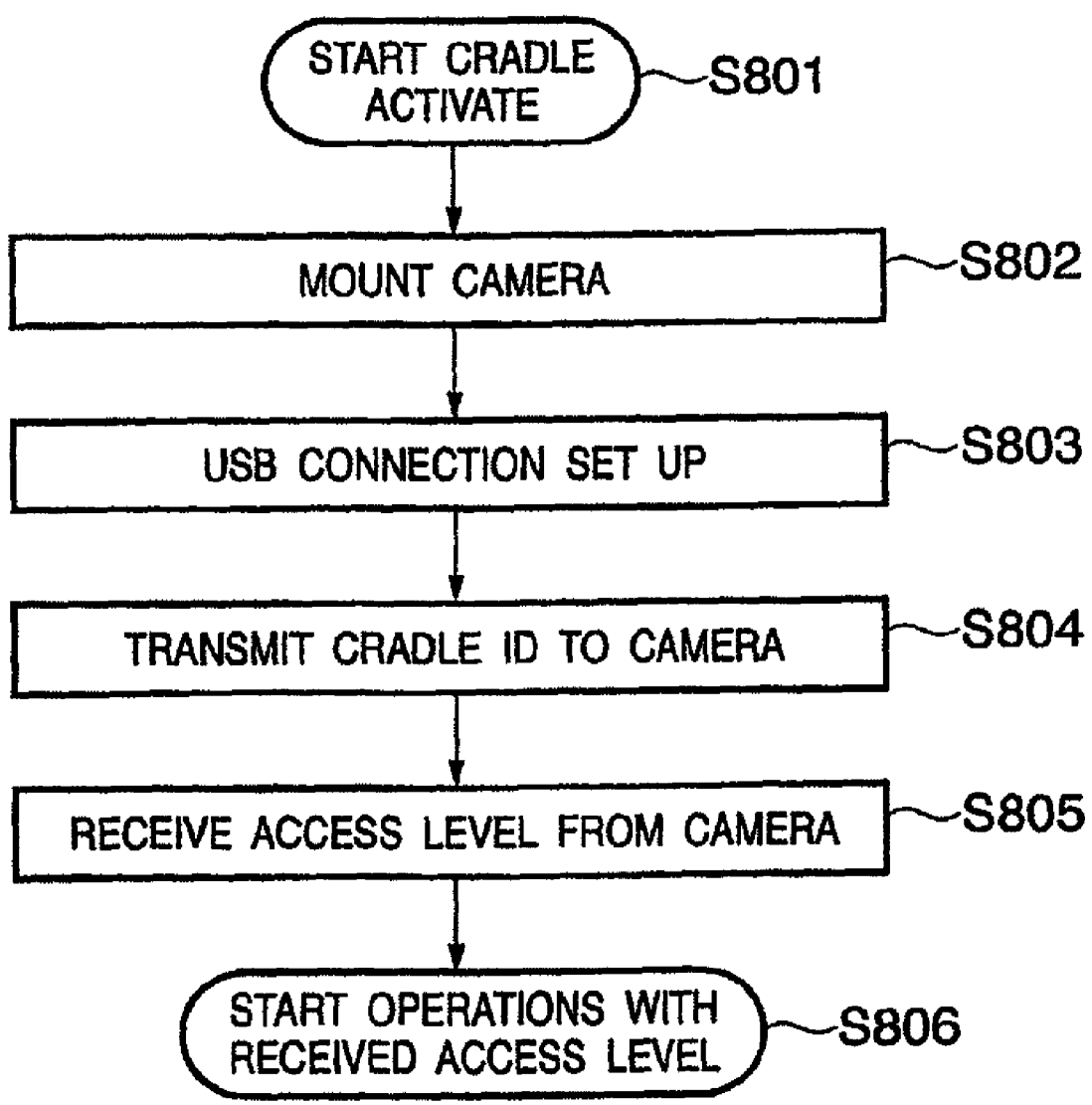
FIG. 9 is a diagram showing a flowchart of the cradle apparatus for setting access levels.
Figure 10:
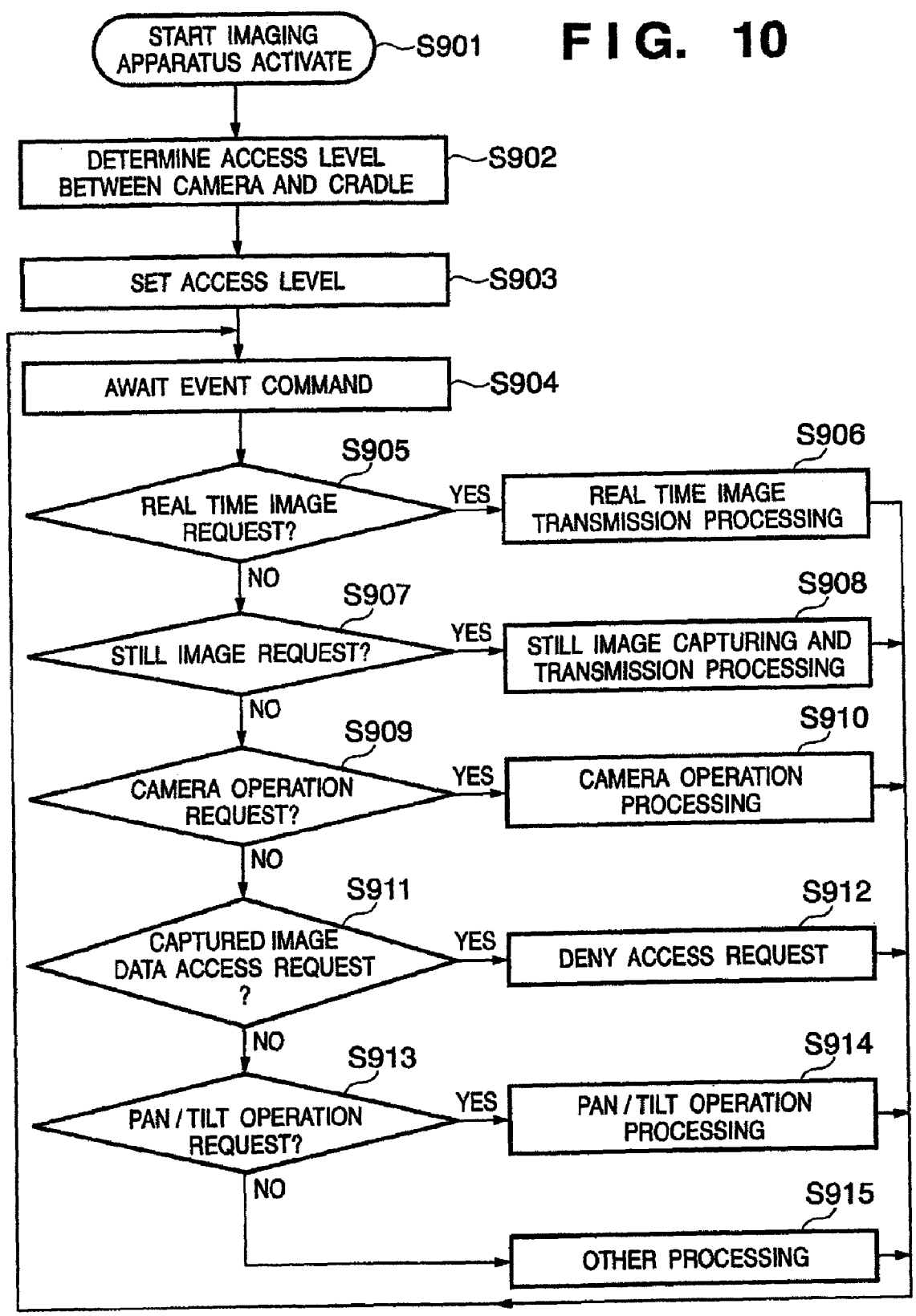
FIG. 10 is a diagram showing a flowchart of an imaging apparatus for setting access levels.

Next, operations up to and including setting access levels when the imaging apparatus 100 is configured by the digital camera 101 and a cradle apparatus 102 will be described with reference to FIGS. 8, 9 and 10. FIG. 8 shows an operation flowchart seen from the digital camera 101, while FIG. 9 shows an operation flowchart seen from the cradle apparatus. FIG. 10 shows an operation flowchart of the imaging apparatus 100.

First, the operation procedure of the digital camera 101 will be described with reference to FIG. 8.

In step S701, the digital camera 101 is activated.

In step S702, the digital camera 101 is mounted onto the cradle apparatus.

In step S703, once mounted onto the cradle apparatus, the digital camera 101 is electrically connected to the cradle apparatus, and set up of USB connection is initiated.

In step S704, once USB connection set up is completed, the digital camera 101 becomes communicable with the cradle apparatus. The acquisition unit 210 of the digital camera 101 acquires a serial number (cradle ID) for individually identifying the cradle apparatus from the same.

In step S705, the comparison unit 211 of the digital camera 101 performs a check to see whether the cradle ID acquired from the cradle apparatus matches the number stored in the set value storage unit 209 in the digital camera 101.

In step S706, the comparison unit 211 of the digital camera 101 determines whether the cradle ID acquired through the search performed in step S703 is registered with the digital camera 101. If it is determined that the cradle ID is registered with the digital camera 101 ("Yes" in step S706), in step S707, the digital camera 101 is set to an access level corresponding to the cradle ID. On the other hand, if it is determined that the cradle ID is not registered with the digital camera 101 ("No" in step S706), in step S708, the digital camera 101 is set to an access level for a case where there are no registered IDs. The access level for a case where there are no registered IDs is the access level that is set as "other cradles" in FIG. 4D.

In step S709, the setting unit 213 of the digital camera 101 sets the access level to itself, and notifies the set access level to the cradle apparatus. Hereafter, the digital camera 101 will commence operations as the imaging apparatus 100 at the set access level. Next, the operation procedure of the cradle apparatus will be described with reference to FIG. 9.

In step S801, the cradle apparatus is activated.

In step S802, the digital camera 101 is mounted.

In step S803, once mounted onto the cradle apparatus, the digital camera 101 is electrically connected to the cradle apparatus, and set up of USB connection is initiated.

In step S804, once USB connection set up is completed, the cradle apparatus and the digital camera 101 become communicable. The cradle apparatus reads out a cradle ID (serial number) stored in the data storage unit 228 for individual recognition, and transmits the cradle ID to the digital camera 101.

In step S805, the above-described operation is performed in the digital camera 101, and the cradle apparatus receives an access level corresponding to the cradle ID. The cradle apparatus commences operations as the imaging apparatus 100 at the received access level.

Next, the operation procedure of the imaging apparatus 100 will be described with reference to FIG. 10.

In step S901, the imaging apparatus 100 is activated.

In step S902, as shown in FIGS. 8 and 9, an access level is determined between the digital camera 101 and the cradle apparatus. In the following description, it is assumed that an access level corresponding to the office cradle shown in Table 1 has been set.

In step S903, the imaging apparatus 100 sets the determined access level.

In step S904, the imaging apparatus 100 enters a waiting state for commands from an event or a network.

In step S905, it is determined whether there is a real time image request from the network. If a real time image request has been issued ("Yes" in step S905), the imaging apparatus 100 performs real time image transmission processing in step S906.

In step S907, it is determined whether there is a still image request. If a still image request has been issued ("Yes" in step S907), in step S908, the imaging apparatus 100 performs still image capturing and transmission processing.

In step S909, it is determined whether there is a request for camera operations such as zooming. If a camera operation request has been issued ("Yes" in step S909), in step S910, the imaging apparatus 100 performs camera operation processing.

In step S911, it is determined whether there has been a request for accessing captured image data, such for as transmission of captured image data, stored in the digital camera 101, from the network. If an access request has been issued ("Yes" in step S911), in step S912, the imaging apparatus 100 denies the access request.

In step S913, it is determined whether there is a pan/tilt request. If a pan/tilt request has been issued ("Yes" in step S913), in step S914, the imaging apparatus 100 performs pan/tilt operation processing.

In step S915, if other processing is required, such processing is respectively performed.

As seen, the imaging apparatus 100 determines access levels and performs operations according to the combination of the digital camera 101 and the cradle apparatus 102.

Next, a method regarding setting access levels to the digital camera 101 which uses user IDs in addition to cradle IDs will be described. By using user IDs, the imaging apparatus 100 will become able to change access levels and perform operations even when the combination is with a cradle apparatus that is not registered with the digital camera 101. This enables the imaging apparatus 100 to be easily operated without having to register an available cradle apparatus with the digital camera 101.

Figure 11:
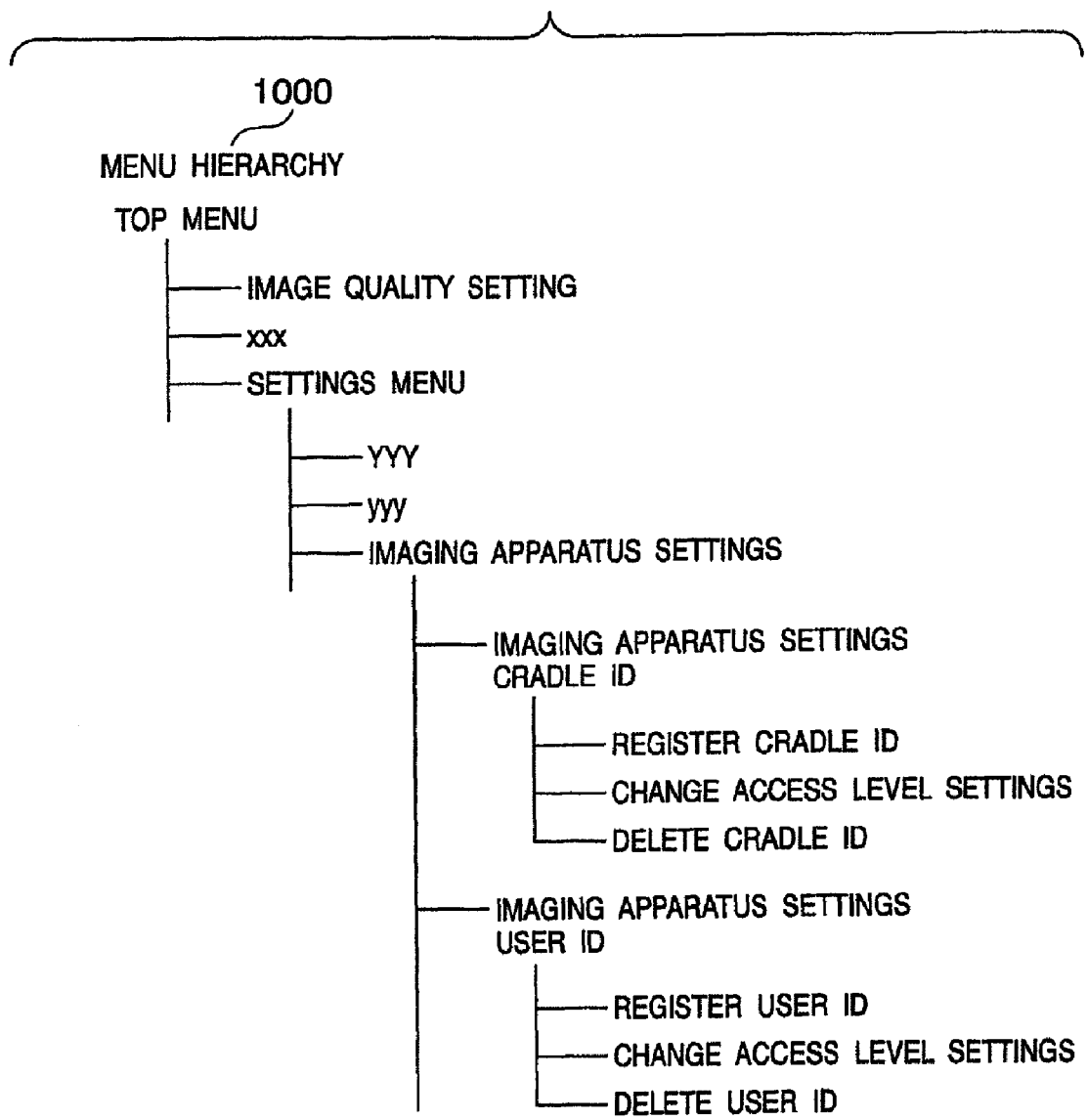
FIG. 11 is a diagram showing a menu of the digital camera.
Figure 12A:
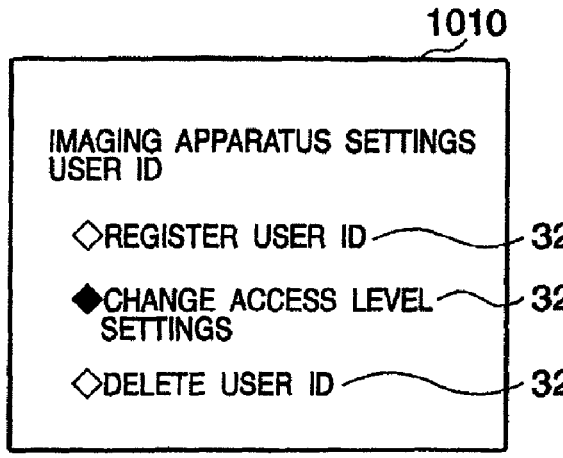
FIGS. 12A to 12E are diagrams showing examples of display screens corresponding to the menus of the digital camera.
Figure 12B:
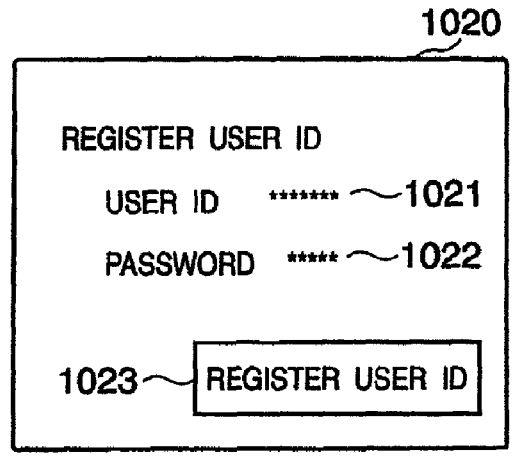
Figure 12C:
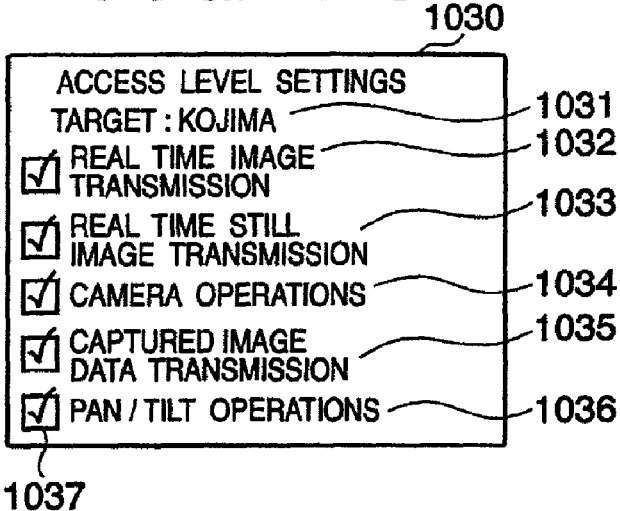
Figure 12D:
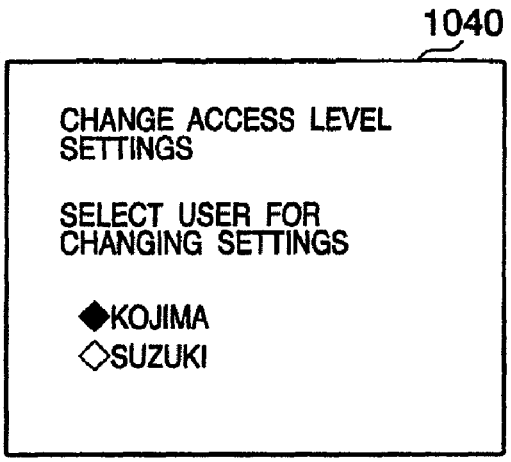
Figure 12E:
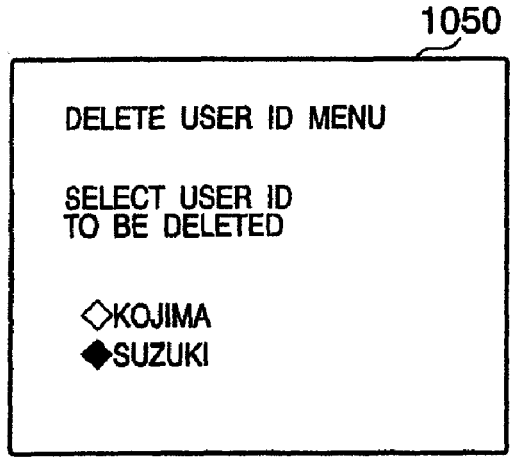

FIG. 11 is a diagram showing a menu hierarchy in the case where user IDs and passwords are used. FIGS. 12A to 12E are diagrams showing examples of display screens corresponding to individual menus. In FIG. 11, reference numeral 1000 denotes a menu hierarchy of the digital camera 101. This menu hierarchy includes menu items related to user IDs, namely: the menus of "imaging apparatus settings user ID," "user ID registration," "change access level settings" and "user ID deletion." Examples of respective display screens for cases where each menu is selected are shown as reference numeral 1010 in FIG. 12A, 1020 in FIG. 12B, 1030 in FIG. 12C, 1040 in FIGS. 12D and 1050 in FIG. 12E. Reference numeral 1010 in FIG. 12A is a menu for imaging apparatus settings using user IDs. Selection and operation of menus are performed in a manner similar to the case described earlier by using the direction key 304 and SET button 303 of the digital camera 101. Reference numeral 1020 in FIG. 12B is a user ID registration screen. The user ID registration screen is used when registering user IDs with the digital camera 101. A user ID is registered by setting a user ID 1021 and a password 1022, and selecting a user ID registration button 1023. Once a user ID is registered, the display proceeds to an access level settings screen (1030 in FIG. 12C) of the imaging apparatus 100 which corresponds to the user ID. The access level settings screen is used to determine items to be accessed by the imaging apparatus 100, and to set whether real time image transmission, real time still image transmission, camera operations, captured image data transmission and pan/tilt operations, as described earlier, will be permitted. Reference numeral 1040 of FIG. 12D denotes an operating screen used when changing an access level corresponding to the user ID. When changing an access level corresponding to the user ID, a user is first selected for changing settings. Next, the access level settings screen (1030 in FIG. 12C) which displays an access level corresponding to the selected user ID is displayed. Changing settings of the access level is performed through this screen. Reference numeral 1050 of FIG. 12E denotes an operating screen used when deleting user IDs. A user ID to be deleted is selected, and the user ID registered with the digital camera 101 and an access level corresponding to the user ID are deleted.

Next, operations of the imaging apparatus 100 using user IDs, and the procedure of operations in the imaging apparatus 100 will be described. FIG. 13 shows a diagram for a case in which the user uses a PC to operate the imaging apparatus 100 via a network. It is assumed that access levels such as those shown in FIGS. 14A and 14B are set for the cradle ID and user ID set to the digital camera 101.

When activated (reference numeral 1101 in FIG. 13), the imaging apparatus 100 reads out an access level corresponding to a cradle ID registered with the digital camera 101, and sets the access level as the access level of the imaging apparatus 100 (1102 in FIG. 13). It is assumed that, at this point, the access level of the cradle ID shown as reference numeral 1201 in FIG. 14A has been set. With this access level, real time image transmission, real time still image transmission and camera operations are permitted. Transmission of captured image data in the digital camera 101 and pan/tilt operations are prohibited in the imaging apparatus 100 in this case, which is composed of a combination of the digital camera 101 and a cradle apparatus 102. The user accesses captured image data stored in the digital camera 101 via a network from a PC using HTTP (reference numeral 1103 in FIG. 13). Since the imaging apparatus 100 prohibits access to captured image data at the currently set access level, the imaging apparatus 100 denies access in procedure 1103, and transmits a user ID authentication page to the PC (reference numeral 1104 in FIG. 13). The user inputs his or her own user ID and password (reference numeral 1105 in FIG. 13) which have been registered in advance with the digital camera 101, and attempts to change the access level. Upon receiving the user ID and password, the imaging apparatus 100 transmits a user ID and password to the digital camera 101 from the CPU inside the cradle apparatus 102 to verify whether the user is registered (reference numeral 1106 in FIG. 13). When the inputted user ID and password match, the digital camera 101 notifies an access level corresponding to the user ID to the cradle CPU (reference numeral 1107 in FIG. 13), and changes and resets the access level of the imaging apparatus 100. The imaging apparatus 100 notifies the user that the user ID has been authenticated (reference numeral 1108 in FIG. 13). It is assumed that the access level corresponding to the set user ID is the access level shown as reference numeral 1202 in FIG. 14B. As shown by reference numeral 1202 in FIG. 14B, the access level in this case allows transmission of captured image data. After confirming that the user ID has been authenticated, the user reattempts to access captured image data stored in the digital camera 101 (reference numeral 1109 in FIG. 13). Since the access level allows captured image data transmission, the imaging apparatus 100 permits access to captured image data in the digital camera 101 by the user.

By using user IDs to access captured image data as described above, captured image data may be accessed without having to register a cradle apparatus with the digital camera 101 even when the imaging apparatus 100 does not allow access to captured image data. In addition, when the digital camera 101 is dismounted from the cradle apparatus, the access level set to the imaging apparatus 100 becomes invalidated. Therefore, when the digital camera 101 is reconnected to the above-mentioned cradle apparatus, since an access level corresponding to the cradle ID will be set, access to captured image data will be denied unless user ID authentication is re-performed.

The relationship between an access level corresponding to a cradle ID and an access level corresponding to a user ID will now be described.

TABLE 2

| CRADLE ID | USER ID | ACCESS LEVEL OF IMAGING APPARATUS |
|---|---|---|
| REGISTERED WITH DIGITAL CAMERA | NOT REGISTERED/BEFORE AUTHENTICATION | ACCESS LEVEL CORRESPONDING TO CRADLE ID |
| | AFTER AUTHENTICATION | ACCESS LEVEL CORRESPONDING TO USER ID |
| NOT REGISTERED WITH DIGITAL CAMERA | NOT REGISTERED/BEFORE AUTHENTICATION | ACCESS LEVEL CORRESPONDING TO OTHER CRADLES |
| | AFTER AUTHENTICATION | ACCESS LEVEL CORRESPONDING TO USER ID |

Table 2 shows combinations of cradle IDs and user IDs, as well as access levels to the imaging apparatus 100 which respectively correspond to the combinations. There are two states regarding a cradle ID, namely, a case where the cradle ID is registered with the digital camera, and a case where the cradle ID is not registered. In addition, two states exist for a user ID, namely, a state in which the user ID is registered with the digital camera 101 but is not yet authorized, and a state in which the user ID has been authorized. The access level to the imaging apparatus 100 is determined by combinations of these states.

First, in a case where the cradle ID is registered with the digital camera 101 but the user ID is not, the access level of the imaging apparatus 100 is set to an access level corresponding to the cradle ID. In addition, in a case where the cradle ID prior to being authenticated is registered with the digital camera 101 and the user ID has been authorized, the access level of the imaging apparatus 100 is set to an access level corresponding to the user ID. Furthermore, in a state where neither the cradle ID nor the user ID is registered with the digital camera 101, the access level of the imaging apparatus 100 is set to an access level corresponding to "other cradles." Moreover, in a state where the cradle ID has been registered with the digital camera 101 but is not yet authenticated, the access level of the imaging apparatus 100 is set to an access level corresponding to "other cradles." The access level of "other cradles" is, as described earlier, an access level of the imaging apparatus 100 as a combination of a cradle apparatus other than the registered cradle apparatus and the digital camera 101. Finally, in a case where the cradle ID is not registered with the digital camera 101 and the user ID has been authorized, the access level of the imaging apparatus 100 is set to an access level corresponding to the user ID.

As seen, by using cradle IDs and user IDs in combination, the imaging apparatus allows access levels to be changed only when access is attempted using a user ID, even with combinations with a cradle apparatus not registered with the digital camera. Therefore, the imaging apparatus may be used in an easy manner at a user's desired access level without having to perform frequent changes of access levels corresponding to cradle IDs.

In addition, for a preferred embodiment of the present invention, a cradle apparatus for exclusive use with digital cameras has been described as the electronic apparatus to be connected to the digital camera. However, the electronic apparatus may instead be devices such as a copying machine or a printer equipped with the cradle functions described above. For instance, in a case with a printer with cradle functions and a digital camera, printing of captured image data is possible if an access level which allows access to captured image data has been set. This also enables protection of captured image data, such as in a case with a printer (cradle ID) not registered with the digital camera which would be denied printing of the captured image data.

Even for a cradle apparatus with communication functions, the digital camera acquires a serial number (cradle ID) of the cradle apparatus, and performs matching of the cradle ID. Therefore, since it is no longer necessary to release captured image data in the digital camera on a network, the digital camera may be charged or used as a monitoring camera without anxiety.

In addition, concomitant use of user IDs allows access levels to the imaging apparatus to be changed per user. Therefore, the access level to an imaging apparatus may be easily changed to a user's access level even when the imaging apparatus is a combination with a cradle apparatus not registered with the digital camera. As a result, the imaging apparatus may be used without having to frequently change settings such as registering or deleting cradle apparatuses with the digital camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-267691, filed Sep. 14, 2005, which is hereby incorporated by reference herein in its entirety.

What is claimed is:

1. A camera cradle system including a camera and a cradle apparatus, comprising:

an acquisition unit configured to acquire an identifier of the cradle apparatus connected to the camera and an identifier of an external apparatus;
and
a controller configured to control transmission of image data captured by the camera based on the identifier of the cradle apparatus and the identifier of the external apparatus acquired by the acquisition unit, wherein, in the control of the transmission by the controller, in a case where the identifier of the cradle apparatus acquired by the acquisition unit corresponds to a first access level, the image data is transmitted to a first external apparatus connected via the cradle apparatus in response to an access from the first external apparatus and the image data is transmitted to a second external apparatus connected via the cradle apparatus in response to the access from the second external apparatus, and in a case where the identifier of the cradle apparatus acquired by the acquisition unit corresponds to a second access level, the image data is transmitted to the first external apparatus in response to the access from the first external apparatus and the image data is not transmitted to the second external apparatus in response to the access from the second external apparatus.

2. The camera cradle system according to claim 1, wherein the controller associates the identifier of the cradle apparatus with set values of access levels for controlling transmission in response to an access from the external apparatus connected via the cradle apparatus, and stores the associated identifier in a memory.

3. The camera cradle system according to claim 1, wherein the access levels include levels which enable access to the image data which was captured by the camera and stored in a memory before accessing from the external apparatus.

4. The camera cradle system according to claim 1, wherein the access levels include levels which enable access to time the image data captured by the camera after accessing from the external apparatus.

5. The camera cradle system according to claim 1, further comprising:
   a registration unit configured to register an identifier of a cradle apparatus in a memory; and
   a setting unit configured to set the access level, which corresponds to the identifier registered in the memory.

6. A control method for controlling a camera cradle system including a camera and a cradle apparatus, comprising:
   an acquisition step for acquiring an identifier of the cradle apparatus connected to the camera and an identifier of an external apparatus; and
   a control step for controlling transmission of image data captured by the camera based on the identifier of the cradle apparatus and the identifier of the external apparatus acquired in the acquisition step,
   wherein, in the control of the transmission,
   in a case where the identifier of the cradle apparatus acquired in the acquisition step corresponds to a first access level, the image data is transmitted to a first external apparatus connected via the cradle apparatus in response to an access from the first external apparatus and the image data is transmitted to a second external apparatus connected via the cradle apparatus in response to the access from the second external apparatus,
   and in a case where the identifier of the cradle apparatus acquired in the acquisition step corresponds to a second access level, the image data is transmitted to the first external apparatus in response to the access from the first external apparatus and the image data is not transmitted to the second external apparatus in response to the access from the second external apparatus.

7. The control method according to claim 6, wherein the access levels include levels which enable access to the image data which was captured by the camera and stored in a memory before accessing from the external apparatus.

8. The control method according to claim 6, wherein the access levels include levels which enable access to the image data captured by the camera after accessing from the external apparatus.

9. The control method according to claim 6, further comprising:
   a registration step for registering an identifier of a cradle apparatus in a memory; and
   a setting step for setting the access level, which corresponds to the identifier registered in the memory.

10. A camera connected to a cradle apparatus, comprising:
    a capturing unit configured to capture image data;
    an acquisition unit configured to acquire an identifier of the cradle apparatus connected to the camera and an identifier of an external apparatus; and
    a controller configured to control transmission of the image data captured by the capturing unit based on the identifier of the cradle apparatus and the identifier of the external apparatus acquired by the acquisition unit,
    wherein, in the control of the transmission by the controller,
    in a case where the identifier of the cradle apparatus acquired by the acquisition unit corresponds to a first access level, the image data is transmitted to a first external apparatus connected via the cradle apparatus in response to an access from the first external apparatus and the image data is transmitted to a second external apparatus connected via the cradle apparatus in response to the access from the second external apparatus,
    and in a case where the identifier of the cradle apparatus acquired by the acquisition unit corresponds to a second access level, the image data is transmitted to the first external apparatus in response to the access from the first external apparatus and the image data is not transmitted to the second external apparatus in response to the access from the second external apparatus.

11. A control method for controlling a camera connected to a cradle apparatus, comprising:
    a capturing step for capturing image data;
    an acquisition step for acquiring an identifier of the cradle apparatus connected to the camera and an identifier of an external apparatus; and
    a controlling step for controlling transmission of the image data captured in the capturing step based on the identifier of the cradle apparatus and the identifier of the external apparatus acquired in the acquisition step,
    wherein, in the control of the transmission,
    in a case where the identifier of the cradle apparatus acquired in the acquisition step corresponds to a first access level, the image data is transmitted to a first external apparatus connected via the cradle apparatus in response to an access from the first external apparatus and the image data is transmitted to a second external apparatus connected via the cradle apparatus in response to the access from the second external apparatus,
    and in a case where the identifier of the cradle apparatus acquired in the acquisition step corresponds to a second access level, the image data is transmitted to the first external apparatus in response to the access from the first external apparatus and the image data is not transmitted to the second external apparatus in response to the access from the second external apparatus.

12. A cradle apparatus connected to a camera, comprising:
    a notification unit configured to notify an identifier of the cradle apparatus to the camera connected to the cradle apparatus;
    a reception unit configured to receive access level information corresponding to the identifier of the cradle apparatus from the camera; and
    a controller configured to control transmission of image data captured by the camera based on the access level information corresponding to the identifier of the cradle apparatus and an identifier of an external apparatus,
    wherein, in the control of the transmission by the controller,
    in a case where the access level information received from the camera corresponds to a first access level, the image data is transmitted to a first external apparatus in response to an access from the first external apparatus and the image data is transmitted to a second external apparatus in response to the access from the second external apparatus,
    and in a case where the access level information received from the camera corresponds to a second access level, the image data is transmitted to the first external apparatus in response to the access from the first external apparatus and the image data is not transmitted to the second external apparatus in response to the access from the second external apparatus.

13. A control method for controlling a cradle apparatus connected to a camera, comprising:
   an notification step for notifying an identifier of the cradle apparatus to the camera connected to the cradle apparatus;
   a reception step for receiving access level information corresponding to the identifier of the cradle apparatus from the camera;
   a controlling step for controlling transmission of the image data captured by the camera based on the access level information corresponding to the identifier of the cradle apparatus and an identifier of an external apparatus,
   wherein, in the control of the transmission,
   in a case where the access level information received from the camera corresponds to a first access level, the image data is transmitted to a first external apparatus in response to an access from the first external apparatus and the image data is transmitted to a second external apparatus in response to the access from the second external apparatus,
   and in a case where the access level information received from the camera corresponds to a second access level, the image data is transmitted to the first external apparatus in response to the access from the first external apparatus and the image data is not transmitted to the second external apparatus in response to the access from the second external apparatus.

* * * * *